United States Patent
Funk et al.

(10) Patent No.: US 12,321,364 B1
(45) Date of Patent: Jun. 3, 2025

(54) SYSTEM AND METHOD FOR AUTOMATIC CREATION OF STRUCTURED DATA OBJECTS FROM UNSTRUCTURED DATA

(71) Applicant: Keeper Tax Inc., San Francisco, CA (US)

(72) Inventors: Thomas Meyer Funk, Albany, CA (US); Thomas Corbin Madsen, San Francisco, CA (US); David Min Kang, San Francisco, CA (US)

(73) Assignee: Keeper Tax Inc., San Francisco, CA (US)

( * ) Notice: Subject to any disclaimer, the term of this patent is extended or adjusted under 35 U.S.C. 154(b) by 0 days.

(21) Appl. No.: 18/373,676

(22) Filed: Sep. 27, 2023

(51) Int. Cl.
*G06F 16/25* (2019.01)
*G06F 16/248* (2019.01)

(52) U.S. Cl.
CPC .................................. *G06F 16/258* (2019.01)

(58) Field of Classification Search
None
See application file for complete search history.

(56) References Cited

U.S. PATENT DOCUMENTS

| | | | |
|---|---|---|---|
| 7,567,976 B1 | 7/2009 | Betz et al. | |
| 7,966,291 B1 | 6/2011 | Petrovic et al. | |
| 8,386,498 B2 * | 2/2013 | Whitehouse | H04L 63/1425 707/755 |
| 8,731,971 B1 * | 5/2014 | O'Neill | G16H 10/60 705/3 |
| 12,038,889 B2 * | 7/2024 | Takata | G06F 16/215 |
| 2005/0240615 A1 * | 10/2005 | Barsness | G06F 16/2456 707/999.102 |
| 2012/0072464 A1 * | 3/2012 | Cohen | G06F 16/215 707/E17.044 |
| 2014/0310290 A1 * | 10/2014 | Huang | G06F 11/3072 707/755 |
| 2015/0213066 A1 * | 7/2015 | Yan | G06F 16/212 707/740 |
| 2017/0132277 A1 * | 5/2017 | Hsiao | G06F 16/2425 |
| 2021/0383249 A1 * | 12/2021 | Goyal | G06F 16/36 |
| 2022/0004568 A1 * | 1/2022 | Patil | G06N 20/00 |

* cited by examiner

*Primary Examiner* — Yu Zhao
(74) *Attorney, Agent, or Firm* — Cesari and McKenna, LLP

(57) ABSTRACT

A system and method for generating structured data objects from unstructured data is provided. The unstructured data is received and parsed by comparing substrings with entries from an entities data structure and a listing of curated patterns to identify and classify substrings. The identified substrings are then ranked and filtered to identify one or more of the most relevant substrings. One or more of the ranked and filtered substrings are used to generate a structured data object.

8 Claims, 6 Drawing Sheets

SYSTEM AND METHOD FOR AUTOMATIC CREATION OF STRUCTURED DATA OBJECTS FROM UNSTRUCTURED DATA

BACKGROUND

In the financial world, transaction information from a credit card provider, bank, or other financial institution is often included on a customer's statement in an unstructured and/or heavily truncated state. This is due to legacy computer systems utilized by financial institutions and/or arbitrary constraints placed on the length of the transaction information fields in financial statements. The truncation/unstructured nature of the transaction data complicates the use of this information by a computer system that typically requires data to be in a particular structured format. More generally, information may often be presented to a system as unstructured data; however, the computer system either requires or would operate more efficiently when the data is in a particular structured format. Thus, it is desirous for the ability to create structured data out of unstructured data in an automated fashion to enable improved computer system performance.

SUMMARY

A system and method for generating structured data objects from unstructured data is provided. The unstructured data, which is typically a text string, is received and parsed by comparing substrings with entries from an entities data structure and a listing of curated patterns to identify and classify substrings. The identified substrings are then ranked and filtered to identify one or more of the most relevant substrings. One or more of the ranked and filtered substrings are used to generate a structured data object. In one illustrative embodiment, the structured data object is a JavaScript Object Notation (JSON) object.

BRIEF DESCRIPTION OF THE DRAWINGS

The above and further advantages of the present invention may be better understood in relation to the accompanying figures, in which like reference numerals indicate identical or substantially identical elements, of which.

DETAILED DESCRIPTION OF AN ILLUSTRATIVE EMBODIMENT

Figure 1:
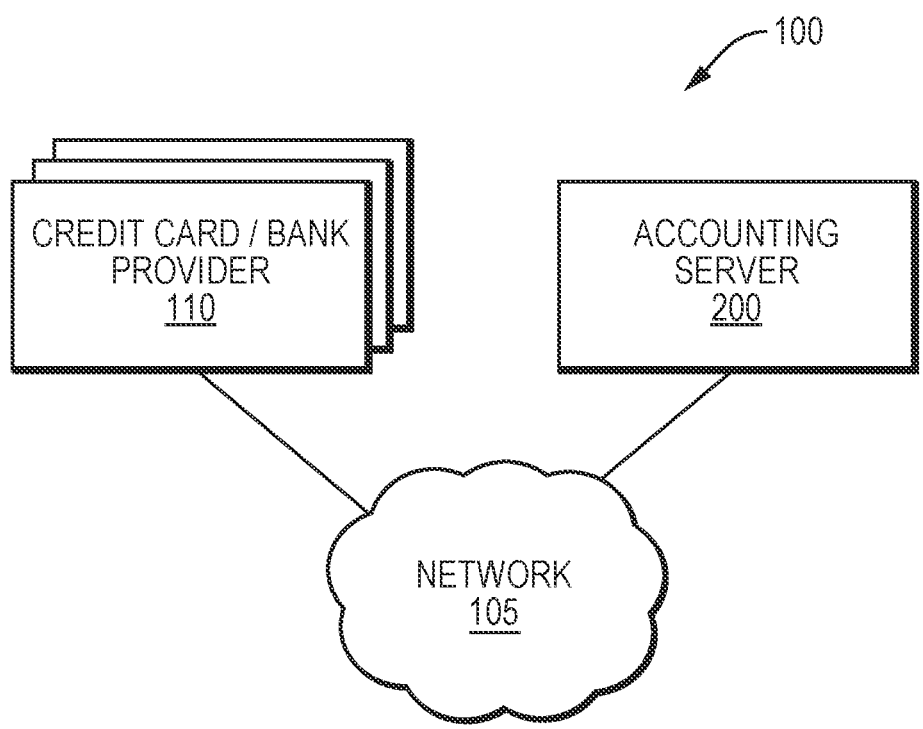
FIG. 1 is a schematic block diagram of an exemplary network environment in accordance with an illustrative embodiment of the present invention.

FIG. 1 is a schematic block diagram of an exemplary computer network environment 100 in accordance with an illustrative embodiment of the present invention. Specifically, the network environment 100 comprises of a network 105 that is operatively interconnected with one or more credit card/bank providers 110 and an accounting server 200. It should be noted that network 105 is illustratively shown as a single network entity. However, it is expressly contemplated that network 105 may comprise of a plurality of interconnecting networks of the same and/or differing types, including, e.g., Wi-Fi networks, cellular telephone networks, local area networks (LANs), and/or wide area networks (WANs) including, for example, the well-known Internet. The various network connected entities typically communicate over the network 105 by exchanging discrete frames or packets of data according to predefined protocols, such as a Transmission Control Protocol/Internet Protocol (TCP/IP), Hypertext Transfer Protocol (HTTP), etc.

It should be noted that while only a single one of each network element is shown, it is expressly contemplated that in alternative embodiments, a plurality of any of the elements may be utilized. Therefore, the description of a single element should be taken as exemplary only. Further, while the description contained herein is written in terms of client-server relationships, it is expressly contemplated that in alternative embodiments parts, or all, of the software functionality may be cloud based. Therefore, the description of physical servers implementing various functionality should be taken as exemplary only.

Credit card/bank provider 110 may represent a computing system that provides financial statements (not shown) in conjunction with, e.g., a credit card, checking account, etc. These financial statements may be provided to the accounting server 200, described further below in connection with FIG. 2. In an illustrative embodiment, these statements may be electronically transferred to server 200 using a third-party application program interface (API), such as that offered by Plaid, Inc. In alternative embodiments, other techniques may be utilized, e.g., performing optical character recognition (OCR) on a paper copy of a statement, etc. Therefore, the description of performing an electronic transfer of statement information should be taken as exemplary only.

It should be noted that while the present invention is shown and described in the context of converting unstructured financial transaction information into a structured data format, it is expressly contemplated that the principles of the present invention may be utilized in other contexts where unstructured data needs to be converted into structured data. Therefore, the description of an accounting environment should be taken as exemplary only.

Figure 2:
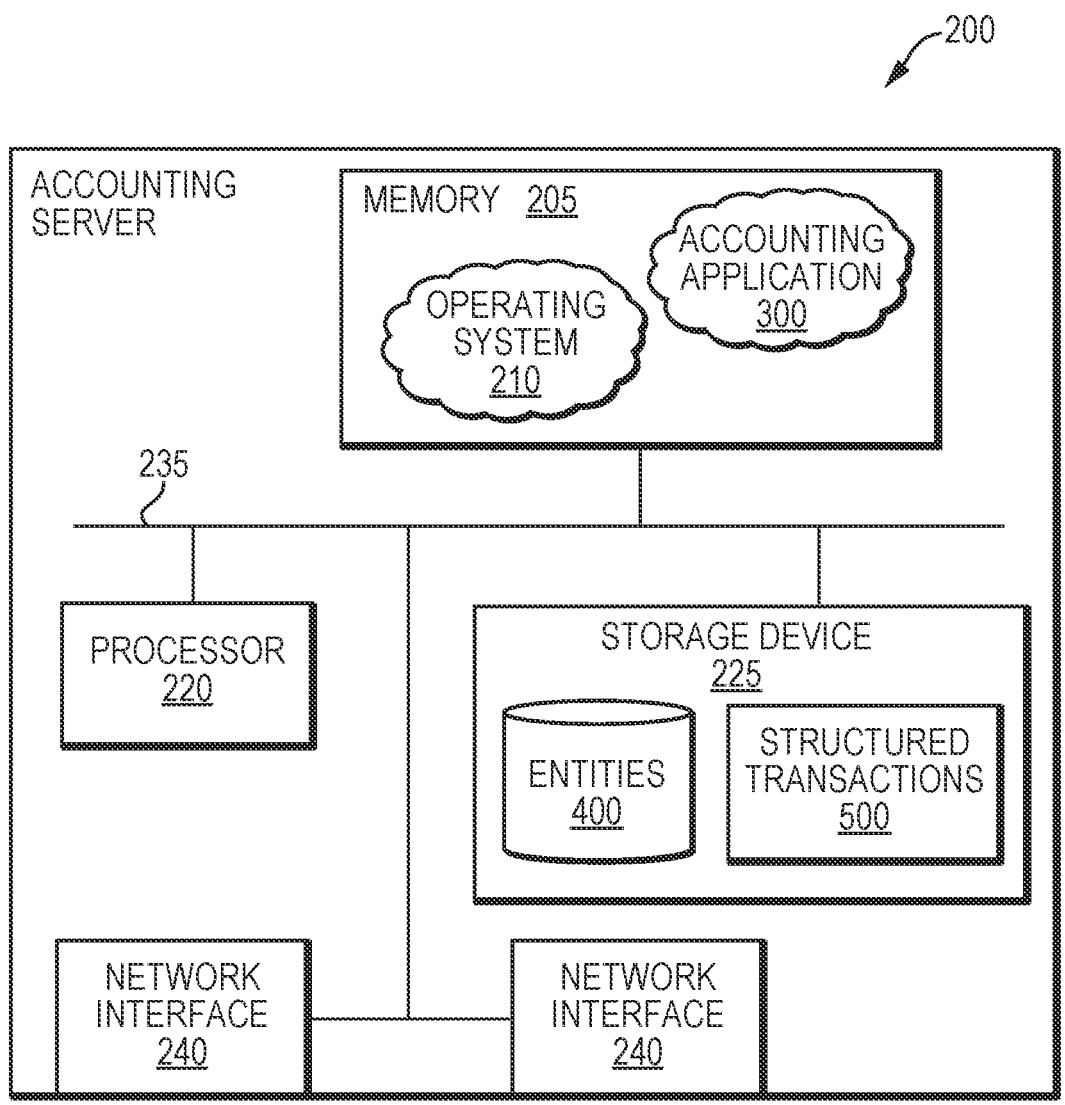
FIG. 2 is a schematic block diagram of an exemplary accounting server in accordance with an illustrative embodiment of the present invention.

FIG. 2 is a schematic block diagram of an exemplary accounting server 200 in accordance with an illustrative embodiment of the present invention. The server 200 may illustratively comprise of one or more network interfaces 240, one or more processors 220, one or more storage devices 225, and a memory 205 operatively interconnected by a system bus 235.

Network interface 240 illustratively contains the mechanical, electrical, and signaling circuitry for communicating data over physical links coupled to a network. The network interface may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, as is known to those skilled in the art.

Memory 205 comprises a plurality of locations that are addressable by the processor(s) 220 and the network interface 240 for storing software programs and data structures associated with the various embodiments described herein. The processor 220 may comprise necessary elements or logic adapted to execute software programs and manipulate data structures. An operating system 210, portions of which are typically resident in memory 205 and executed by the processor(s), functionally organizes the server 200 by, inter alia, invoking network operations in support of software processes and/or services executing on the server.

An accounting application 300 is stored in memory 205 and executed by processor 220 to implement accounting functions of the server. Such accounting functions may include, inter alia, the conversion of unstructured transaction data into a structured data object format for use in performing various accounting/bookkeeping functions. In alternative embodiments, the accounting application 300 may comprise a differing type of application. Therefore, the description of accounting application should be taken as exemplary only. Further, while it is shown and described as a single server running the application 300, in alternative embodiments, a plurality of differing servers may execute multiple copies of accounting application 300. As will be appreciated by those skilled in the art, differing software and/or network architectures may be utilized to obtain scalability, redundancy, etc.

The storage device 225, which may be internal or external to the server 200, stores data. In alternative embodiments, storage device 225 may comprise a plurality of devices, which may be internal and/or external to server 200. Storage device 225 may comprise a cloud-based storage, RAID array, etc. in accordance with alternative embodiments of the present invention. Illustratively, the storage device may store an entity database 400, described below in reference to FIG. 4, and a structured transactions data structure 500, described below in reference to FIG. 5.

In alternative embodiments of the present invention, the various functionalities may be distributed among a plurality of servers. As such, the description of a single server 200 should be taken as exemplary only. Also, while the embodiments herein are described in terms of processes or services implemented as software executing on a processor, alternative embodiments may include the processes described herein being embodied as modules consisting of hardware, software, firmware, and/or combinations thereof. Therefore, the description of software applications should be taken as exemplary only.

Figure 3:
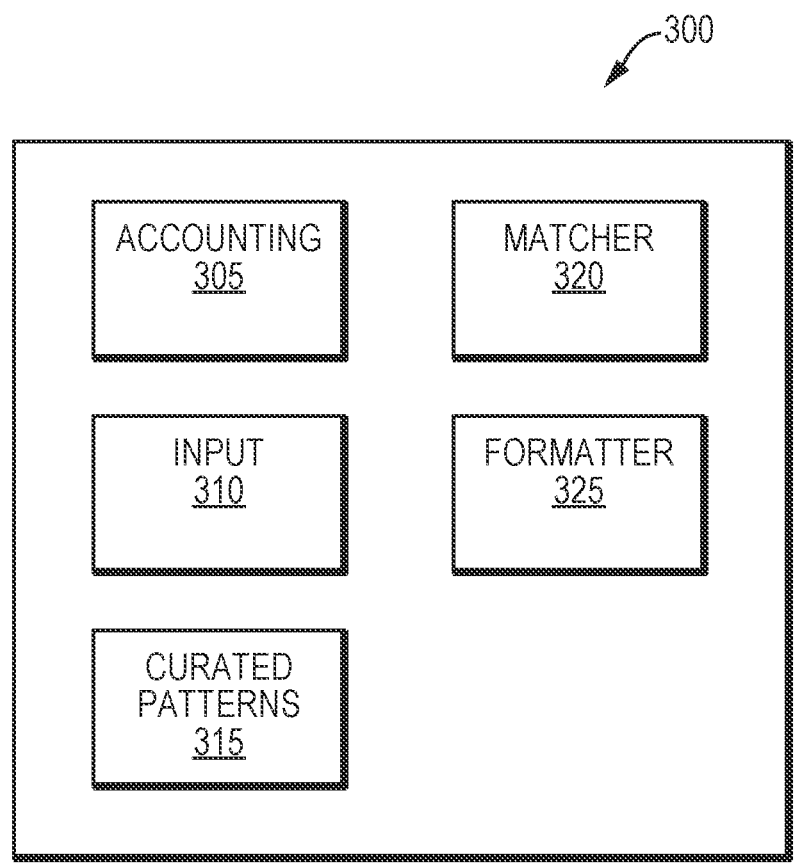
FIG. 3 is a schematic block diagram of exemplary software in accordance with an illustrative embodiment of the present invention.

FIG. 3 is a schematic block diagram of exemplary accounting software 300 in accordance with an illustrative embodiment of the present invention. Illustratively, the software 300 implements an accounting system as well as the principles of the present invention. Exemplary software 300 comprises a plurality of differing modules including, for example, an accounting module 305, an input module 315, a curated patterns module 315, a matcher module 320, a formatter module 325, and a network interface module 240. It should be noted that while the term modules is used herein, it is expressly contemplated that other forms of software may be utilized, e.g., monolithic, layers, separate processes/threads, etc. Therefore, the description of the term module should be taken as exemplary only.

Illustratively, the accounting module 305 implements one or more accounting/bookkeeping functions. For example, the accounting module 305 may implement such functionality as the well-known QuickBooks, available from Intuit, Inc. Alternatively, the accounting module 305 may implement differing accounting/bookkeeping functionality. One example is the automated detection of tax write-offs functionality available from Keeper Tax, Inc. More generally, in alternative embodiments of the present invention, the accounting module 305 may implement differing functionality not related to accounting/bookkeeping. That is, the accounting module 305 should be taken to represent any software module that requires structured data but receives the data in unstructured format. The principles of the present invention may be utilized to convert the unstructured data into a structured data object to enable the accounting module 305 to function in a more efficient manner.

The input module 310 operates to receive unstructured data relating to financial transactions. Illustratively, this may be accomplished by obtaining such information using an API from Plaid, Inc. However, in alternative embodiments, the information may be obtained using alternative techniques, such as performing OCR on a paper copy of a financial statement. Therefore, the description of using Plaid should be taken as exemplary only.

The curated patterns module 315 illustratively stores curated patterns that are specific types of patterns that appear in financial statements. Curated patterns module 315 utilizes such curated patterns via a set of rules to examine the unstructured data received via the input module 310. The matcher module 320 utilizes entries from the entity database 400, in combination with the curated patterns, to match subsets of text strings to entity types to provide improved performance.

The formatter module 325 ranks entries in an intermediate data object by importance and are then filtered and organized so that only the most relevant results are included. Further, the formatter module 325 may create the structured data object as an output in an illustrative embodiment of the present invention. Illustratively, the output data object is provided as a JavaScript Object Notation (JSON) data structure. However, it should be noted that in alternative embodiments, differing data structure formats may be utilized. Therefore, the description of using a JSON data structure should be taken as exemplary only.

Figure 4:
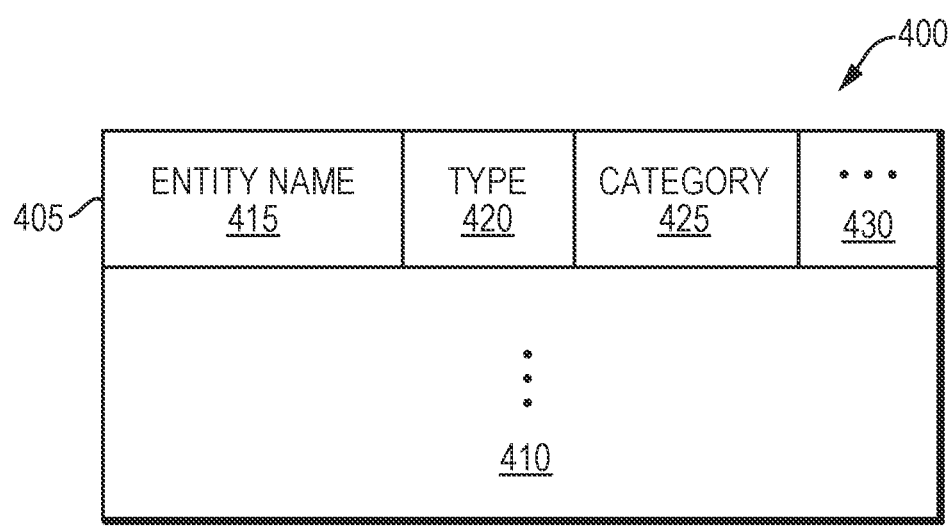
FIG. 4 is a schematic block diagram of an exemplary entity database data structure in accordance with an illustrative embodiment of the present invention.

FIG. 4 is a schematic block diagram of an exemplary entity database 400 in accordance with an illustrative embodiment of the present invention. Illustratively, database 400 includes a plurality of entries 405. Each entry 405 is associated with a particular entity who may appear on a financial statement, e.g., a payee, a bank, a merchant, etc. Each entry 405 in the database 400 illustratively comprises a plurality of fields including, e.g., an entity name field 415, a type field 420, a category field 425, and, in alternative embodiments, additional fields 430. It should be noted that while entity database is shown and described as a database, in alternative embodiments of the present invention, a non-database data structure may be utilized. Therefore, the description of a database should be taken as exemplary only.

The entity name field 415 stores the name of a particular entity which may appear on a financial statement. The type field 420 stores the type of entity associated with the entity name 415. Exemplary types may include bank, payment processor, merchant, information, account, payee, location, and/or garbage. It should be noted that in alternative embodiments of the present invention, additional and/or differing types may be utilized. Therefore, the types described herein should be taken as exemplary only.

Figure 5:
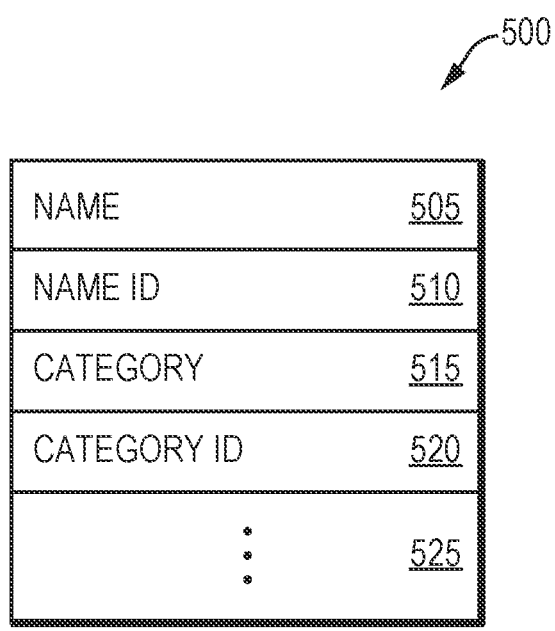
FIG. 5 is a schematic block diagram of an exemplary structured data object storing transaction information in accordance with an illustrative embodiment of the present invention.

The category field 425 stores category information associated with the entity. This may be a classification of the expenses associated with the entity. For example, the entity name field 415 may store "Electric Company," while the associated type field 420 stores "Merchant." In this example, the category field 425 may store "Utilities." FIG. 5 is a block diagram of an exemplary structured data object 500 in accordance with an illustrative embodiment of the present invention. The exemplary data object 500 includes a plurality of fields including, for example, a name field 505, name identifier field 510, category field 515, category ID field 520, and, in alternative embodiments of the present invention, additional fields 525. In an illustrative embodiment of the present invention, the structured data object 500 is implemented as a JavaScript Object Notation (JSON) data structure. However, it should be noted that in alternative embodiments of the present invention, differing data structures may be utilized. Therefore, the description contained herein of the structured data object as being implanted as a JSON data structure should be taken as exemplary only.

The name field 505 stores the name of an entity associated with the transaction. Illustratively, the name field 505 may also be stored in one or more truncated variations to aid in mapping. This truncation is described further below in reference to FIG. 6. The name ID field 510 stores a (typically) numeric identifier that identifies the entity named in the name field 505. The category field 515 stores the category associated with the transaction, while the category ID field 520 stores an identifier of the category.

Figure 6:
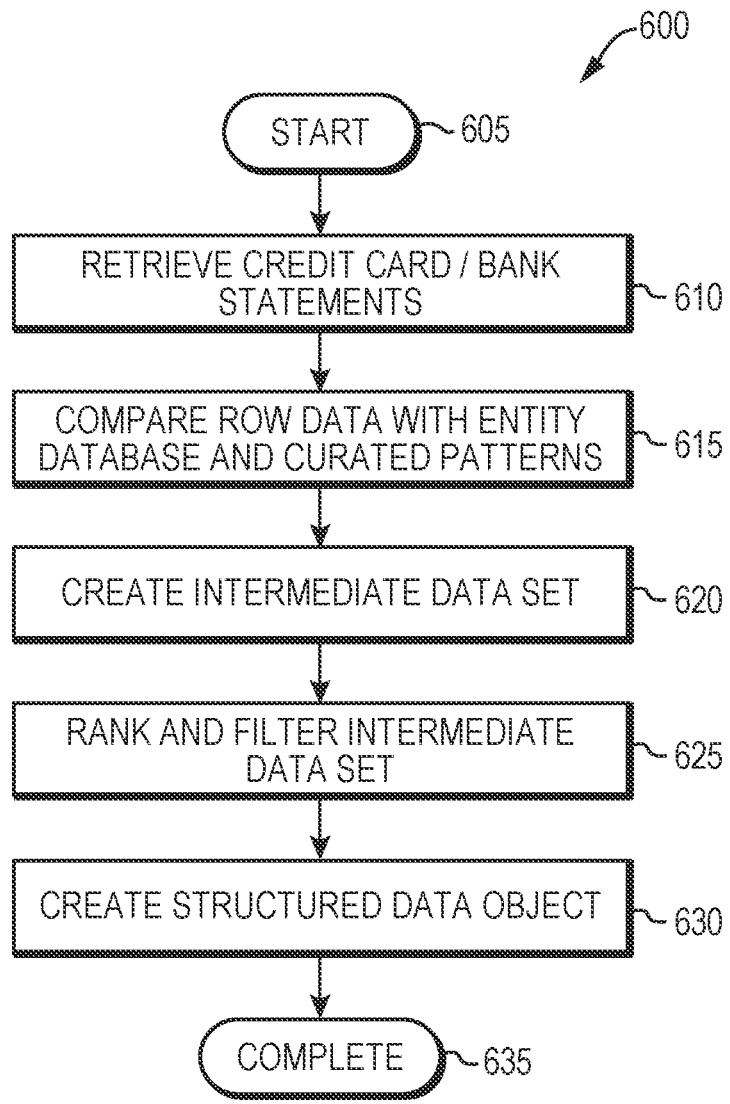
FIG. 6 is a flowchart detailing the steps of a procedure for creating a structured data object from unstructured data in accordance with an illustrative embodiment of the present invention.

FIG. 6 is a flowchart detailing the steps of procedure 600 for generating structured data objects from unstructured data. The procedure 600 begins in step 605 and continues to step 610 where the system retrieves financial statements. As noted above, these financial statements may be retrieved using the well-known Plaid API; however, in alternative embodiments other techniques may be utilized. For purposes of illustration, assume that one of the transaction entries retrieved is:

DES: WEB PGANDE ONLINE TRANSER ID: XXXXX1234 INDN: JOHHNY SM ID: XXXXX8888 SACRAMENTO

This illustrative unstructured data set represents the payment of an electric/gas bill to Pacific Gas and Electric. This exemplary transaction will be used by way of example throughout procedure 600.

The data from the retrieved financial statements are compared with the entity database and curated patterns in step 615. The combination of entries from the entity database and the curated patterns are combined to form a dictionary that may be used to map to substrings within the unstructured transaction data.

Additionally, the system may include a set of truncated entries that aid in mapping should a name be truncated in the unstructured data. This truncation process illustratively is applied to entries in the entity database. Illustratively, each entry may have one or more truncations created based on the length of the entity's name. These truncations may be variable length and are illustratively shortened to a predefined length, e.g., seven characters. For example, "Southwest Airlines" may be represented as "Southwest Airline," "Southwest Airlin," "Southwest Airli," "Southwest Airl," "Southwest Air," "Southwest Ai," "Southwest A," "Southwest," or even "Southwes" in the unstructured transaction data. All of these truncated entries would be mapped to "Southwest Airlines."

Illustratively, the curated patterns are regular expression mappings that are utilized to describe a more general substring pattern that should be matched. An exemplary curated pattern is:

"pattern": [
   {"LOWER": "online"},
   {"LOWER": "transfer"},
   {"LOWER": "ref"},
   {"OP": "+"},
   {"LOWER": "to"},
   {"LOWER": "platinum"},
],
"map_to": "platinum card"

This exemplary curated pattern would be utilized to map a substring having a format of "online transfer ref XXX to platinum," where "XXX" represents any series of alphanumeric characters, to "platinum card."

From the comparison with the entity database and curated patterns, an intermediate data set is generated in 620. This intermediate data set represents the unstructured data that has had substrings labelled. Using the example above, the intermediate data set may be represented by:

| | |
|---|---|
| DES: WEB | No mapping |
| PGANDE | Merchant |
| ONLINE TRANSER | Information |
| ID: XXXXX1234 | Account |
| INDN: JOHHNY SM | No mapping |
| ID: XXXXX8888 | Account |
| SACRAMENTO | Location |

The intermediate data set is then ranked and/or filtered in step 625. This ranking and filtering may occur by identifying the most relevant substrings and utilizing those, while ignoring irrelevant or low ranked substrings. Illustratively, the intermediate data set has a set of labeled substrings filtered out. The remaining substrings are then ranked. In one exemplary embodiment, the labelled substrings may contain overlapping sections. While filtering the intermediate data set, for each pair of labels that contain overlapping substrings, the procedure drops the less useful label. The usefulness of a particular label may be determined by a variety of factors including, e.g., length of the substring, the label type (merchant, account, etc.), the position within the overall string, etc. It should be noted that other and/or differing factors may be utilized in determining the usefulness of a particular label. Therefore, the particular actors described herein should be taken as exemplary only.

At the conclusion of filtering, each labeled substring is mutually exclusive and no two contain any overlapping text. Illustratively, each label type has an index score and the remaining entries are ranked based on the value of their respective index score. The system retains a predefined number of the top scores, e.g., the top two. In alternative embodiments, varying numbers of scores may be retained. Therefore, the description of a particular number of scores and/or a predefined constant number of scores should be taken as exemplary only. Illustratively, the substrings associated with predefined number of top scores are used to create an entry in the structured data structure.

After filtering and ranking the intermediate data set, the system then creates a structured data object 500 in step 630. As noted above, this may be an exemplary JSON data structure. An exemplary JSON data structure for the example described herein would be:

{'clean_name': 'PG&E',
'display_name_id': 1234,
'category': 'utilities',
'category_id': 56}

Illustratively, the top predefined number of substrings from the ranking step are used to create the clean_name field. The remaining data in the structured data object 500 may be obtained from metadata associated with the entity's entry in the entity database. The structured data object may then be passed to software modules that require structured data objects to operate on. The procedure 600 then completes in step 635.

According to the one or more embodiments as described herein, unstructured data (e.g., unstructured electronic financial transaction information) can be converted to a structured data object such that a computing device, e.g., server 200 executing accounting application 300, can more easily and efficiently process electronic data when compared to conventional systems and techniques that would simply process the unstructured data, which may result in increased CPU usage and errors.

Because the one or more embodiments as described herein allow for a computing device to more efficiently process electronic data through use the described structured object, the one or more embodiments as described herein conserve processing resources when compared to conventional systems. As a result, the one or more embodiments as described herein provided an improvement to the computer, e.g., server 200, itself.

As explained, the one or more embodiments as described herein are directed to, among other things, providing systems and techniques that allow computing devices to more efficiently process electronic data. As such, the one or more embodiments as described herein are specifically directed to solving a problem rooted in computer technology. That is to say, attempting to process unstructured electronic data is a computer based problem and not something that, for example, is encountered during human analysis. Therefore, the one or more embodiments as described herein are directed to addressing and solving a technical computer problem. Accordingly, the one or more embodiments as described herein provide an improvement in the technological field of electronic data processing by computing devices.

While this description has been written in terms of a financial software system, the principles of the present invention may be utilized with any form of software system that requires structured data to operate on but receives data in an unstructured format. As such, the description of a financial system should be taken as exemplary only. While various components have been described as being implemented in hardware or software, it should be noted that it is expressly contemplated any of the functionality described herein may be implemented in hardware, software, firmware, or a combination thereof.

What is claimed is:

1. A computer implemented method comprising the steps of:
    receiving, by a processor of a hardware computing device, a set of unstructured electronic data;
    parsing the unstructured electronic data to identify a plurality of substrings;
    determining that each of the plurality of substrings match an entry in one or more stored data sets; and
    assigning, by a processor of a hardware computing device, a label to each of the plurality of substrings in response to determining that each of the plurality of substrings matches the entry, wherein assigning the labels generates a plurality of unstructured labeled substrings, wherein each of the plurality of unstructured labeled substrings include a label portion that stores a particular label and a substring portion that stores a particular substring;
    determining, by a processor of a hardware computing device, if a first unstructured labeled substring and a second unstructured labeled substring, of the plurality of unstructured labeled substrings, include particular substring portions that store overlapping substrings;
    selecting, in response to determining that the first unstructured labeled substring and the second unstructured labeled substring include the particular substring portions that store the overlapping substrings, a particular unstructured labeled substring of the first unstructured labeled substring and the second unstructured labeled substring based on a comparison of particular labels stored in the label portions of the first unstructured labeled substring and the second unstructured labeled substring; and
    generating, by the processor of the hardware computing device, a structured electronic data object for the unstructured electronic data using the particular unstructured labeled substring instead of a non-selected unstructured labeled substring of the first unstructured labeled substring and the second unstructured labeled substring, wherein the generating comprises:
        (1) using a particular label of the particular unstructured labeled substring to determine a first field name for the structured electronic data object, wherein the particular substring of the particular unstructured labeled substring is stored in an entry of the structured electronic data object that corresponds to first field name, and
        (2) using at least one different label of a selected unstructured labeled substring, of the plurality of unstructured labeled substrings that does not include the particular substring portions that store overlapping substrings, to determine a second field name for the structured electronic data object, wherein the selected substring of the selected unstructured labeled substring is stored in a second entry of the structured electronic data object that corresponds to the second field name; and
    updating an electronic database, including the first field name and the second field name, with the generated structured electronic data object.

2. The computer implemented method of claim 1 further comprising ranking the plurality of unstructured labeled substrings.

3. The computer implemented method of claim 1 wherein the set of unstructured electronic data represents one or more financial transactions.

4. The computer implemented method of claim 1 wherein the one or more stored data sets comprises an entities data set.

5. The computer implemented method of claim 1 wherein the one or more stored data sets comprises a curated lists data set.

6. The computer implemented method of claim 1 wherein parsing the unstructured electronic data to identify the plurality of substrings comprises identifying one or more substrings that have been truncated.

7. The computer implemented method of claim 6 further comprising expanding the one or more truncated substrings to an untruncated format.

8. The computer implemented method of claim 1 wherein the structured electronic data object is a JavaScript Object Notation data object.

\* \* \* \* \*